(12) United States Patent
Pankajakshan et al.

(10) Patent No.: US 9,414,186 B2
(45) Date of Patent: *Aug. 9, 2016

(54) SYSTEM AND METHOD FOR PROVIDING SELECTIVE VOICEOVER4G CALL BLOCKING

(71) Applicant: METROPCS WIRELESS, INC., Richardson, TX (US)

(72) Inventors: Bejoy Pankajakshan, Plano, TX (US); Erik Kosar, Richardson, TX (US); Robert Wondoloski, Richardson, TX (US)

(73) Assignee: T-MOBILE USA, INC., Bellevue, WA (US)

( * ) Notice: Subject to any disclaimer, the term of this patent is extended or adjusted under 35 U.S.C. 154(b) by 147 days.

This patent is subject to a terminal disclaimer.

(21) Appl. No.: 14/026,839

(22) Filed: Sep. 13, 2013

(65) Prior Publication Data

US 2014/0133361 A1 May 15, 2014

Related U.S. Application Data

(63) Continuation of application No. 13/677,409, filed on Nov. 15, 2012, now Pat. No. 8,537,758.

(51) Int. Cl.
*H04L 12/16* (2006.01)
*H04W 4/02* (2009.01)
*H04W 8/18* (2009.01)
*H04L 29/06* (2006.01)

(52) U.S. Cl.
CPC ............ *H04W 4/02* (2013.01); *H04L 65/1006* (2013.01); *H04L 65/1016* (2013.01); *H04L 65/1069* (2013.01); *H04W 8/18* (2013.01); *H04L 69/22* (2013.01)

(58) Field of Classification Search
USPC .......... 370/252–328, 331–352; 455/418–445, 455/411
See application file for complete search history.

(56) References Cited

U.S. PATENT DOCUMENTS

| 8,948,746 B1 * | 2/2015 | Oroskar .................... 455/426.1 |
| 9,014,092 B2 * | 4/2015 | Sen et al. ................... 370/328 |
| 2012/0099573 A1 * | 4/2012 | Jalkanen .................... 370/338 |

(Continued)

OTHER PUBLICATIONS

Patent Cooperation Treaty: International Preliminary Report on Patentability for PCT/US2013/069995; May 19, 2015, Moon, Kihwan, 6 pages.

*Primary Examiner* — Man Phan
(74) *Attorney, Agent, or Firm* — Howison & Arnott, LLP

(57) ABSTRACT

A method for selectively blocking Voiceover4G services within a wireless communications network is provided. A request for access to Voiceover4G services is received from a device connected to a wireless communications network. A location of the device is determined from information contained within the request. A determination is made of whether Voiceover4G services are provided at the location by the wireless communications network at the location of the device indicated within the request. The device is configured to communicate over the wireless network using Voiceover4G services responsive to a determination that the Voiceover4G services are provided at the location of the device or is configured to communicate over the wireless network using circuit switched services responsive to a determination that the Voiceover4G services are not provided at the location of the device.

17 Claims, 4 Drawing Sheets

(56) References Cited

U.S. PATENT DOCUMENTS

| | | | |
|---|---|---|---|
| 2012/0258707 A1* | 10/2012 | Mathias et al. | 455/426.1 |
| 2013/0017805 A1* | 1/2013 | Andre-Jonsson et al. | 455/411 |
| 2013/0195009 A1* | 8/2013 | Ramle et al. | 370/328 |
| 2014/0204901 A1* | 7/2014 | Hedman et al. | 370/331 |

\* cited by examiner

FIG. 1
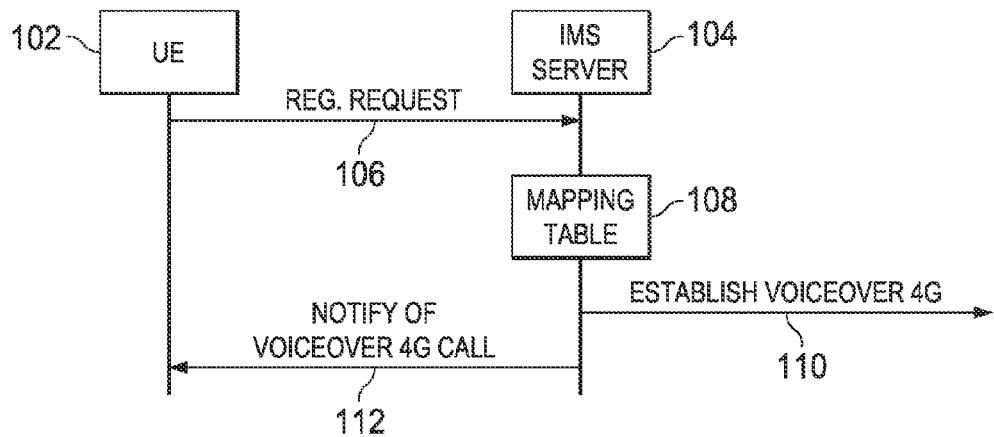
FIG. 2
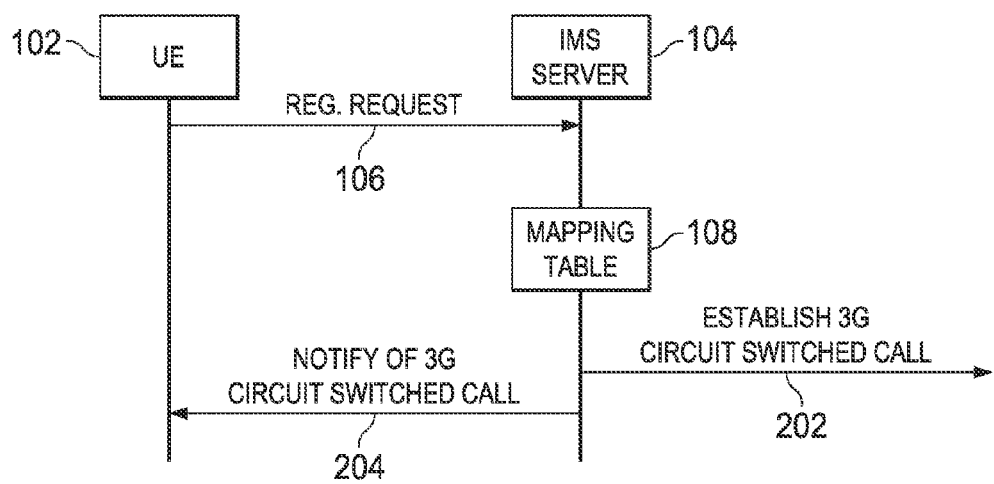
FIG. 3
| MAPPING TABLE | |
|---|---|
| LOCATION | VOICEOVER 4G ALLOWED |
| XXXX | Y |
| XXXX | N |
| XXXX | N |
| XXXX | Y |

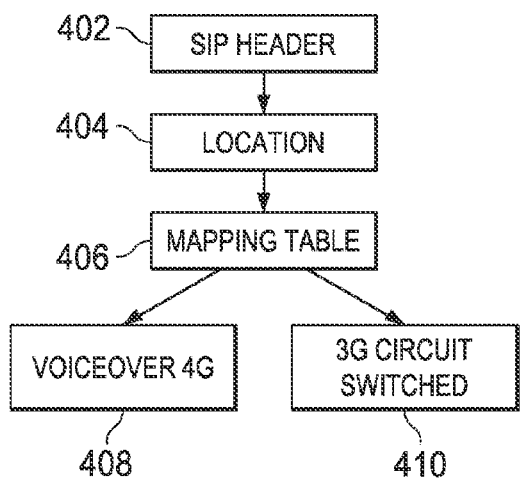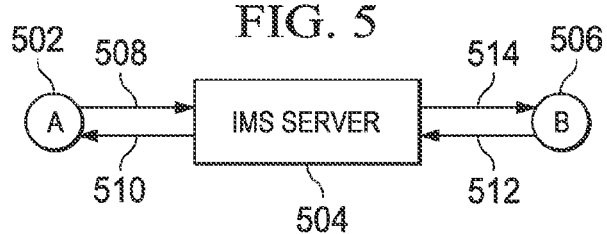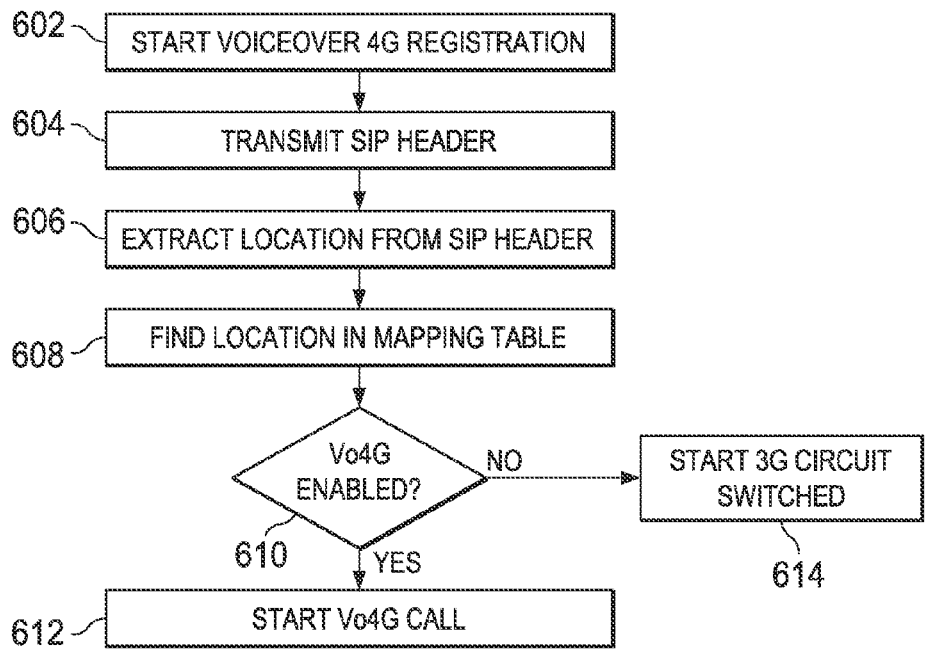

US 9,414,186 B2

SYSTEM AND METHOD FOR PROVIDING SELECTIVE VOICEOVER4G CALL BLOCKING

CROSS REFERENCE TO RELATED APPLICATION

This application is a continuation of U.S. patent application Ser. No. 13/677,409, filed Nov. 15, 2012, now U.S. Pat. No, 8,537,758 entitled SYSTEM AND METHOD FOR PROVIDING VOICEOVER4G CALL BLOCKING, the specification of which is incorporated herein in its entirety.

TECHNICAL FIELD

The present invention relates to Voice over 4G service offerings, and more particularly, to the selective blocking of Voice over 4G services based upon a location or identity of a device attempting to establish a connection to Voice over 4G services.

BACKGROUND

A Voice over 4G call, such as Voice over LTE (VoLTE), is based upon the IP multimedia subsystem (IMS) network and has specific profiles for control and media planes of voice service on 4G. This approach results in the voice service being delivered as data flows within a 4G data carrier. This means that there is no dependency on the legacy circuit switched voice network in order to maintain a call. Many mobile communication devices have the ability to provide voice call services using both 4G communication services and circuit switch communication services such as CDMA, GSM, or UMTS-based call connection services. The availability of 4G network support for voice call connections is not ubiquitous, and 4G voice services may or may not be available in particular areas. Additionally, the possibility exists for Voiceover4G services and circuit switched-based services to both be available within a particular area, but for various reasons the use of Voiceover4G services for supporting a call would not provide an optimal customer experience. Thus, there is a need to have the ability to block the provision of Voiceover4G call services from certain locations from certain devices as well as the ability to test Voiceover4G services within particular markets where the call services may not have yet been launched.

SUMMARY

The present invention as disclosed and described herein, comprises a method for selectively blocking Voiceover4G services within a wireless communications network. A request for access to Voiceover4G services is received from a device connected to a wireless communications network. A location of the device is determined from information contained within the request. A determination is made of whether Voiceover4G services are provided at the location by the wireless communications network at the location of the device indicated within the request. The device is configured to communicate over the wireless network using Voiceover4G services responsive to a determination that the Voiceover4G services are provided at the location of the device and is configured to communicate over the wireless network using circuit switched services responsive to a determination that the Voiceover4G services are not provided at the location of the device.

BRIEF DESCRIPTION OF THE DRAWINGS

For a more complete understanding, reference is now made to the following description taken in conjunction with the accompanying Drawings in which:

FIG. 1 illustrates a manner of establishing call registration for a Voiceover4G call within a system providing Voiceover4G call services;

FIG. 2 illustrates a request for Voiceover4G call services in a system denying a Voiceover4G call registration;

FIG. 3 provides an illustration of the mapping table used for selective Voiceover4G call blocking;

FIG. 4 illustrates the manner in which location information from a SIP header may be used for selectively establishing either a Voiceover4G call or 3G circuit switched call;

FIG. 5 illustrates a process for location-based selective Voiceover4G call connection;

FIG. 6 is a flow diagram describing the process of location-based selective Voiceover4G call connections;

DETAILED DESCRIPTION

Figure 7:
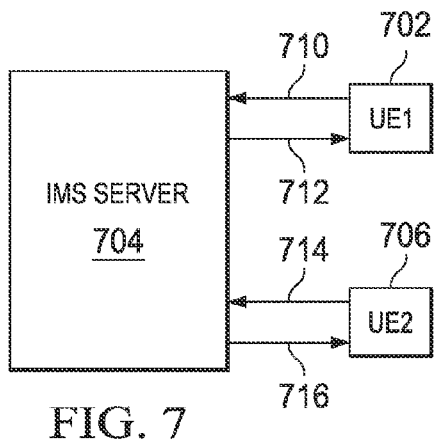
FIG. 7 illustrates a manner for selective Voiceover4G call establishment based upon a device attempting to establish the Voiceover4G call.

Referring now to the drawings, wherein like reference numbers are used herein to designate like elements throughout, the various views and embodiments of a system and method for providing selective Voiceover4G call blocking are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated the manner in which a user equipment 102 may attempt to establish a Voiceover4G call connection with a destination number through an IMS server 104. The Voiceover4G call connection may comprise for example a Voice over LTE (VoLTE) call or any other type of 4G voice call service. The user equipment 102 transmits a registration request 106 to the IMS server 104 requesting the establishment of the ability to make a Voiceover4G call from the user equipment 102 to a destination number over the 4G network. The connection from the user equipment 102 to the IMS server 104 is not necessarily direct, but may occur through a number of various nodes of a wireless network. Associated with the IMS server 104 is a mapping table 108 that provides a mapping of the locations from which a user equipment 102 may be making a call to an indication of the allowance or non-allowance of Voiceover4G call services. Thus, based upon the location of the user equipment 102, the mapping table 108 enables a determination of whether the ability to have Voiceover4G call services should be allowed at a particular location. If the mapping table 108 indicates that Voiceover4G call services are allowed, an indication 110 is provided within the multimedia services network to enable the establishment of Voiceover4G calls by the user equipment 102. The user equipment 102 is notified at 112 of the ability to access Voiceover4G call functionalities when the need arises.

Referring now also to FIG. 2, there is illustrated a second situation wherein the user equipment 102 generates a Voiceover4G registration request 106 to the IMS server 104. However, in this case, the mapping table 108 associated with the IMS server 104 indicates that Voiceover4G services are not available to the location presently serving the user equipment 102. In this case, the IMS server 104 generates an indication to establish a 3G circuit switched call 202, such as a CDMA call, rather than the ability to establish Voiceover4G calls. The user equipment 102 is provided a notification 204 to establish voice calls using CDMA or other type of circuit switched services since Voiceover4G call services are not presently available.

Referring now to FIG. 3, there is more particularly illustrated the structure of the mapping table 108. While the configuration of FIG. 3 illustrates the mapping table 108 including a location column 302 and a Voiceover4G availability indication column 304, it will be appreciated that various other types of configuration may be possible as long as information relating to the availability or non-availability of Voiceover4G services at particular locations or from particular units may be provided. The location column 302 provides a variety of locations that have particular Voiceover4G service indications associated there with. Each location entry 308 has associated there with a Voiceover4G indication 310 indicating whether Voiceover4G services are available or not available at the particular location. Thus, for example in the illustration of FIG. 3, the first location 308 entry within the table indicates that Voiceover4G services are available, the second and third entries indicate that Voiceover4G services are not available, and the fourth entry indicates that Voiceover4G services are available with the associated locations. As mentioned previously, in addition to information about particular locations and the availability or non-availability of Voiceover4G services, other types of information such as particular user equipment that may or may not have Voiceover4G services associated therewith or large coverage areas or markets rather than specific cell site locations may have Voiceover4G service/non-service indications associated therewith.

Referring now to FIG. 4, there is illustrated the manner in which user equipment may determine an ability to complete Voiceover4G calls from a particular location. When the user equipment attempts an initial registration within the network, it transmits a SIP header 402 to the IMS server that is associated with the user equipment. In some embodiments the SIP header 402 may comprise a PANI header. Within the IMS server, the location 404 of the user equipment is extracted from the SIP header 402. This location information 404 is provided to a mapping table 406 that is associated with the IMS server in order to make a comparison of the location to the table entries and find the associated indication of whether Voiceover4G services are available or unavailable from the present location of the user equipment. Based upon the results of the comparison within the mapping table 406, the user equipment may be registered as being able to carry out Voiceover4G calls at 408, or alternatively, if Voiceover4G services are not available to the device, registering the device to connect via 3G circuit switched services 410 such as CDMA services.

Referring now to FIGS. 5 and 6, there is illustrated a first example of selective Voiceover4G call services blocking based upon a particular location of the user equipment attempting to register to receive Voiceover4G call services. FIG. 5 illustrates a situation wherein a first device at a location 502 is attempting to register for Voiceover4G call services at an IMS server 504, and a second device at location 506 is also attempting to register to receive Voiceover4G call services with the IMS server 504. In the first case, the device at location 502 transmits a registration request message, including a SIP header as a request 508 from the location 502 to the server 504. Within the IMS server 504, the location information is extracted from the SIP header and a determination is made that Voiceover4G call services are available at location 502 based on data within an associated mapping table. A Voiceover4G call service response 510 is transmitted back from the IMS server 504 to the location 502 to provide an indication that Voiceover4G call services are now available.

Similarly, the second mobile device at location 506 transmits a Voiceover4G call service request 512, including a SIP header, to the IMS server 504 to request registration for Voiceover4G call services. In this case, the location information extracted from the SIP header will provide an indication that Voiceover4G call services are not available at location 506 when compared to the location entry in the mapping table. The Voiceover4G denial and an indication of circuit switch services response 514 is transmitted back to the location 506 from the IMS server 504 to indicate to the mobile device that voice calls must be made using circuit switch services rather than Voiceover4G call services.

This process is more fully illustrated in the flow diagram of FIG. 6. A device initiates Voiceover4G call registration at step 602 in an attempt to register the device to transmit and receive voice calls using Voiceover4G services. As part of the registration process, the device will transmit a SIP header at step 604 from the user equipment to the IMS server in an attempt to register to access Voiceover4G call functionalities. These transmissions occur over the associated wireless network and nodes. Using the information within the SIP header, location information is extracted at step 606 from the SIP header in order to provide an indication of where the user equipment attempting to register with the system is presently located. This location is found at step 608 within the mapping table associated with the IMS server 504 in order to determine whether Voiceover4G call service functionalities are available from the location at which the user equipment is presently located. Inquiry step 610 determines whether Voiceover4G is enabled at the present location as indicated within the mapping table and either initiates Voiceover4G call services at step 612, or if Voiceover4G call services are denied, initiate 3G circuit switched call services at step 614 or some other type of circuit switch voice call connection functionality as provided by the wireless system.

Figure 8:
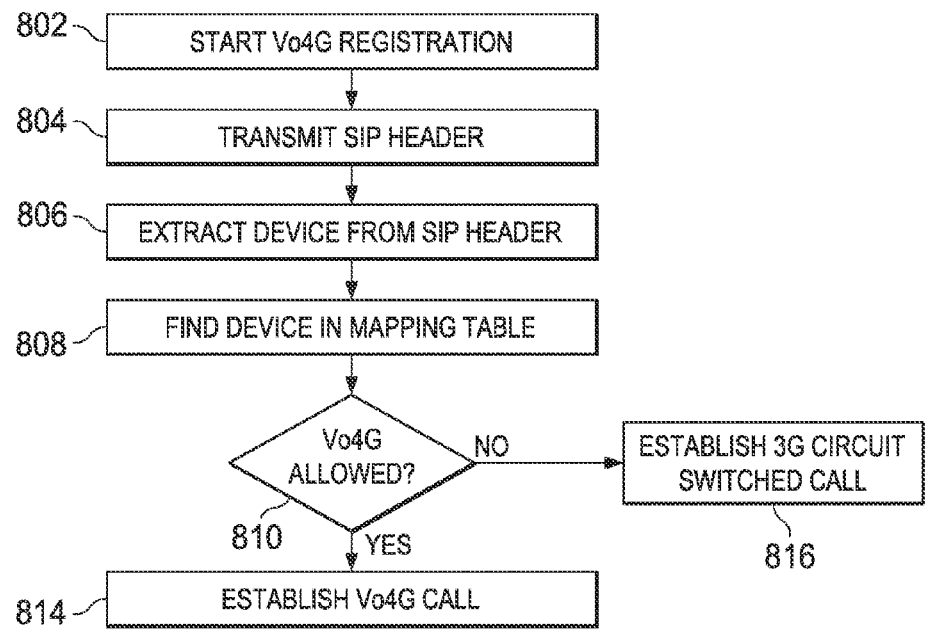
FIG. 8 is a flow diagram illustrating the process for selective establishment of a Voiceover4G call based upon the device attempting to establish the call.

Referring now to FIGS. 7 and 8, there is illustrated a device-based selective Voiceover4G call blocking process wherein only particular devices are granted access to Voiceover4G call services within a particular network or at a particular location. This type of access control is useful in situations where Voiceover4G services must be tested within a particular market where the Voiceover4G services have not yet been officially launched. Individual devices would need to act as test devices in order to confirm functionality of the services within the market. Thus, for example, a first user equipment 702 would not be granted Voiceover4G service access within a particular market. When the device 702 transmitted a Voiceover4G request 710 within this market to the IMS server 704, the mapping table would look up the device based upon its calling number and/or SIP header content to determine the identity of the device and that the device was not able to access Voiceover4G services within the market. A message 712 indicating no Voiceover4G services and indication for connection to a circuit switch system would be transmitted back to the first user equipment 702 from the IMS server 704.

However, a second user equipment 706 would be provided access for testing Voiceover4G services within the same new market. When the user equipment 706 transmits a Voiceover4G service request 714 to the IMS server 704, the server uses the mapping table associated with the IMS server 704 to determine that the user equipment 706 is allowed to access Voiceover4G services within the present network based upon the calling number and/or SIP header content. A grant of Voiceover4G service message 716 is transmitted back to the user equipment 706 from the IMS server 704 enabling the device 706 to access Voiceover4G services within the network.

Referring now to FIG. 8, there is illustrated a flow diagram more particularly illustrating the process of FIG. 7. When a particular user equipment initiates, at step 802, Voiceover4G registration with the IMS server 704, the device transmits at step 804 a SIP header from the user equipment to the IMS server 704. The calling mobile number and other SIP header information content is extracted from the SIP header to determine call-based selective blocking as described previously with respect to FIGS. 5 and 6, and alternatively may be used to determine the particular device that is making the call. The particular device is located within the mapping table at step 808 to determine if the device is able to receive Voiceover4G services within the present network that it is located. Inquiry step 810 determines whether Voiceover4G is allowed for the device, and if so, the Voiceover4G call service functionalities are established for the device at step 814. If Voiceover4G call service functionalities are not allowed for the device, the device is set up to receive 3G circuit switched calls such as a CDMA call at step 816.

Figure 9:
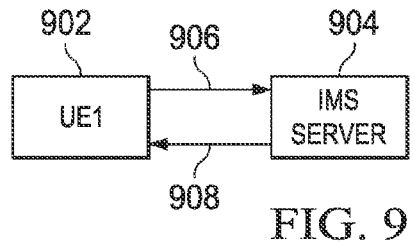
FIG. 9 illustrates the establishment of a Voiceover4G call within a network providing Voiceover4G services.
Figure 10:
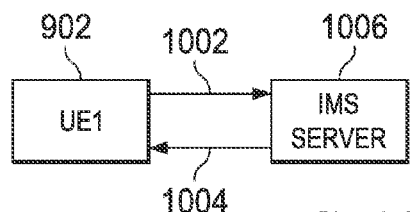
FIG. 10 illustrates a device attempting to establish a Voiceover4G call within a network that does not provide Voiceover4G call connection services.
Figure 11:
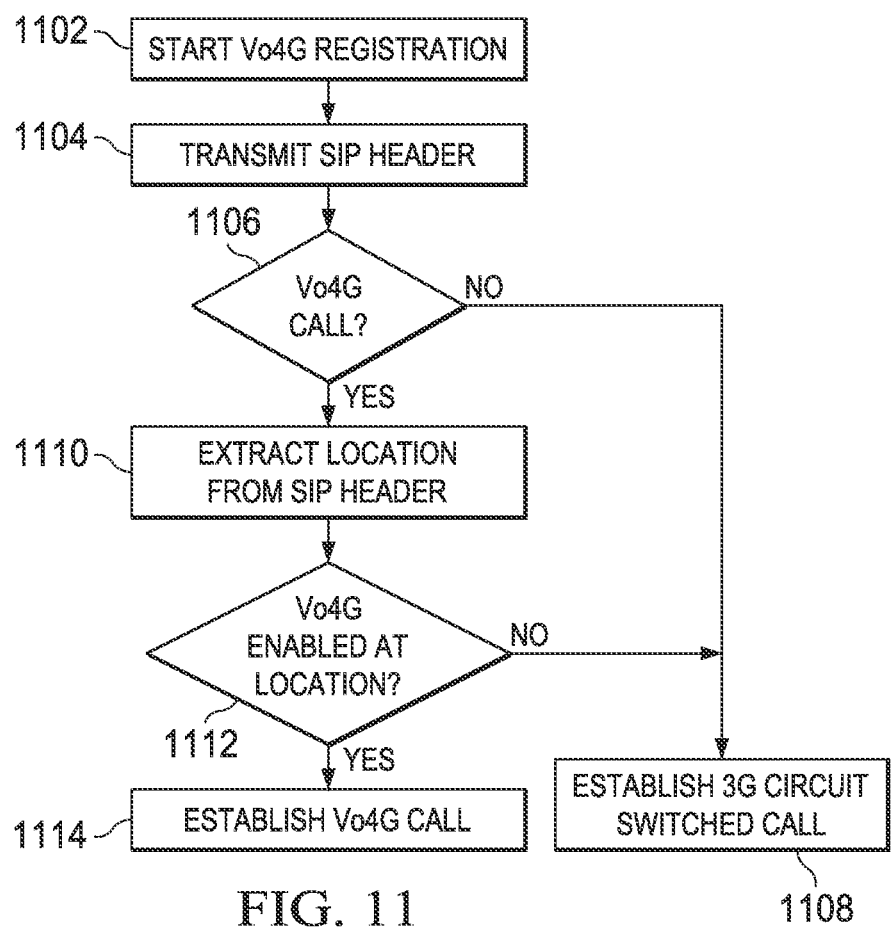
FIG. 11 is a flow diagram describing the manner for establishing a Voiceover4G call that considers whether a present location of the user equipment connects with a network providing Voiceover4G call connection services.

Referring now to FIGS. 9-11, there is illustrated the manner for selectively blocking Voiceover4G call services based upon the particular market that a Voiceover4G device is located within. In this case, the user equipment 902 illustrated in FIG. 9 and FIG. 10 each comprise the same device but the device is trying to connect with different markets. In FIG. 9, the user equipment 902 is attempting to access Voiceover4G call services within a first market and within FIG. 10 is attempting to access Voiceover4G call services within a second, different market. In the case of FIG. 9, the user equipment 902 transmits a Voiceover4G call services request 906 to the IMS server 904 within the first market. When accessing the mapping table information, the server determines that Voiceover4G call services are available for the user equipment within this market, and the IMS server transmits back a Voiceover4G grant message 908 indicating that the user equipment 902 has been registered to receive Voiceover4G call functionalities within the present network.

With respect to FIG. 10, the user equipment 902 is located within the second market associated with IMS server 1006. The user equipment 902 transmits a Voiceover4G services request 1002 to the IMS server 1006. The IMS server 1006 accesses the mapping table associated therewith and determines that Voiceover4G call services are not available within the present network for the user equipment 902. The user equipment 902 is notified via a message 1004 from the IMS server 1006 indicating that Voiceover4G call services are not available and voice call connections via CDMA or other types of 3G circuit switch services are necessary.

FIG. 11 is a flow diagram illustrating the process for connecting devices which may be granted Voiceover4G call service functionalities within one market network but not in others. The user equipment initiates the process by requesting Voiceover4G registration at step 1102 and transmitting a SIP header at step 1104 to an associated IMS server. Inquiry step 1106 determines if the present network provides Voiceover4G call services. If not, control passes to step 1108 and the user equipment is provided 3G circuit switched call functionalities for providing voice call services. If inquiry step 1106 determines that Voiceover4G call services are available within the network, the location information for the user equipment 902 is extracted from the SIP header at step 1110. Inquiry step 1112 determines if Voiceover4G is enabled at the particular location within the network that the user equipment is located, and if so, enables the establishment of Voiceover4G call service functionalities at step 1114. If inquiry step 1112 determines that Voiceover4G services are not available at that location, the user equipment is configured for CDMA or other type of 3G circuit switched call functionalities at step 1108.

Thus, using the above-described functionalities and processes, a service provider can provide more efficient control of devices attempting to access either Voiceover4G voice call services or 3G circuit switched call services. Voiceover4G call service functionality coverage is not ubiquitous like CDMA or other type of 3G circuit switched call functionality processes. The above-described process provides service providers with the ability to block Voiceover4G call functionalities from certain locations that would not well serve a customer. Additionally, it provides a service provider with the ability to test the Voiceover4G services in various markets where the services have not yet been officially launched.

It will be appreciated by those skilled in the art having the benefit of this disclosure that this system and method for providing selective Voiceover4G call blocking provides an improved manner of providing selective Voiceover4G call functionalities. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for selectively blocking Voiceover4G services within a wireless communications network, comprising:
   receiving a request having a location associated therewith for access to the Voiceover4G services from a device connected to the wireless communications network;
   accessing a table defining a list of locations, the table mapping each of the locations to an indication of an allowance or non-allowance of the Voiceover4G services responsive to the request;
   finding the location included within the request within the table providing the list of locations responsive to the request;
   determining whether the Voiceover4G services are provided at the location included within the request by the wireless communications network based upon whether the indication associated with the location in the table indicates that the Voiceover4G services are allowed or not allowed at the location;

initiating the Voiceover4G services to the device responsive to a determination that the indication indicates that the Voiceover4G services are allowed at the location; and initiating circuit switched services to the device responsive to a determination that the indication indicates that the Voiceover4G services are not allowed at the location.

2. The method of claim 1, wherein the step of receiving the request further comprises the step of receiving a SIP header within the request from the device.

3. The method of claim 2, further including the step of extracting the location of the device from the SIP header received from the device.

4. The method of claim 1, wherein the step of generating further comprises the steps of:

configuring the device to communicate over the wireless communications network using the Voiceover4G services responsive to the determination that the Voiceover4G services are provided at the location of the device; and configuring the device to communicate over the wireless communications network using the circuit switched services responsive to the determination that the Voiceover4G services are not provided at the location of the device.

5. The method of claim 1, further including the steps of:

determining an identity of the device that generated the request for access to the Voiceover4G services;

determining whether the Voiceover4G services are provided to the device by the wireless communications network responsive to the determined identity;

configuring the device to communicate over the wireless communications network using the Voiceover4G services responsive to the determination that the Voiceover4G services are provided to the device and at the location of the device; and configuring the device to communicate over the wireless communications network using circuit switched services responsive to the determination that the Voiceover4G services are not provided to the device or at the location of the device.

6. The method of claim 1, further including the steps of:

determining whether the Voiceover4G services are provided by the wireless communications network the device is accessing; and configuring the device to communicate over the wireless communications network using the circuit switched services responsive to a determination that the Voiceover4G services are not provided by the wireless communications network.

7. A system for selectively blocking Voiceover4G services within a wireless communications network, comprising:

a server connected to the wireless communications network, the server receiving a request for access to the Voiceover4G services from a device connected to the wireless communications network;

a data table associated with the server including a plurality of locations in the wireless communications network, each of the plurality of locations having an indication of whether the Voiceover4G services are available at the plurality of locations;

wherein the server further determines whether the Voiceover4G services are provided by the wireless communications network at a location of the device using the data table; and wherein the device is configured to communicate over the wireless communications network using the Voiceover4G services responsive to a determination that the Voiceover4G services are provided to the device and at the location of the device, and further wherein the device is configured to communicate over the wireless communications network using circuit switched services responsive to a determination that the Voiceover4G services are not provided to the device or at the location of the device.

8. The system of claim 7, wherein the request includes a SIP header including the location.

9. The system of claim 8, wherein the server extracts the location of the device from the SIP header received from the device.

10. The system of claim 7, wherein the data table further includes at least one particular communications device and a second indication of whether the Voiceover4G services are available to the at least one particular communications device.

11. The system of claim 10, wherein the server further:

determines an identity of the device that generated the request for access to the Voiceover4G services and determines whether the Voiceover4G services are provided to the device by comparing the identity with the at least one particular communications device in the data table;

configures the device to communicate over the wireless communications network using the Voiceover4G services responsive to a determination that the Voiceover4G services are provided to the device and the Voiceover4G services are provided at the location of the device; and configures the device to communicate over the wireless communications network using the circuit switched services responsive to a determination that the Voiceover4G services are not provided to the device or the Voiceover4G services are not provided at the location of the device.

12. An apparatus for selectively blocking Voiceover4G services within a wireless communications network, comprising:

a mobile device for communicating with the wireless communications network;

wherein the mobile device generates a request for access to the Voiceover4G services through the wireless communications network, the request including a location of the mobile device;

wherein the request from the mobile device enables finding the location of the mobile device within a table providing a list of locations, each location of the list of locations including an indication of whether the Voiceover4G services are provided at the location and determining whether the Voiceover4G services are provided at the location included within the request responsive to the indication associated with the location in the table;

wherein the mobile device receives a response responsive to the determination of whether the Voiceover4G services are provided at the location of the mobile device; and wherein the mobile device is configured to communicate over the wireless communications network using the Voiceover4G services responsive to a determination that the Voiceover4G services are provided to the device and at the location of the device, and further wherein the mobile device is configured to communicate over the wireless communications network using circuit switched services responsive to a determination that the Voiceover4G services are not provided to the device or at the location of the device.

13. The apparatus of claim 12, wherein the mobile device generates a SIP header including the location of the mobile device within the request from the mobile device.

14. The apparatus of claim 12, wherein the mobile device is configured to communicate over the wireless communications network using the Voiceover4G services responsive to the response indicating the determination that the Voiceover4G services are provided at the location of the mobile device.

15. The apparatus of claim 12, wherein the mobile device is configured to communicate over the wireless communications network using the circuit switched services responsive to the response indicating the determination that the Voiceover4G services are not provided at the location of the mobile device.

16. The apparatus of claim 12, wherein the request enables a determination of an identity of the mobile device that generated the request for access to the Voiceover4G services and the determination of whether the Voiceover4G services are provided to the identified mobile device by the wireless communications network.

17. The apparatus of claim 12, wherein the mobile device further determines whether the Voiceover4G services are provided by the wireless communications network the device is accessing, and configures the device to communicate over the wireless communications network using the circuit switched services responsive to the determination that the Voiceover4G services are not provided by the wireless communications network.

* * * * *